United States Patent
Micacchi

(10) Patent No.: US 8,430,009 B2
(45) Date of Patent: Apr. 30, 2013

(54) SAW TOOTH FOR CIRCULAR SAW

(76) Inventor: Maurice Micacchi, Woodstock (CA)

( * ) Notice: Subject to any disclaimer, the term of this patent is extended or adjusted under 35 U.S.C. 154(b) by 856 days.

(21) Appl. No.: 12/524,902

(22) PCT Filed: Jan. 11, 2008

(86) PCT No.: PCT/CA2008/000066
§ 371 (c)(1),
(2), (4) Date: Jul. 29, 2009

(87) PCT Pub. No.: WO2008/092239
PCT Pub. Date: Aug. 7, 2008

(65) Prior Publication Data
US 2010/0011934 A1    Jan. 21, 2010

Related U.S. Application Data

(60) Provisional application No. 60/897,873, filed on Jan. 29, 2007.

(51) Int. Cl.
*B27B 33/02* (2006.01)
(52) U.S. Cl.
USPC ............................................. 83/837; 83/838
(58) Field of Classification Search ............ 83/835, 83/837, 838, 839, 840; 144/241, 228, 34.1; 407/42, 116, 114, 115; D15/139
See application file for complete search history.

(56) References Cited

U.S. PATENT DOCUMENTS

| | | | |
|---|---|---|---|
| 869,574 A | * | 10/1907 | Huther .............................. 83/838 |
| 2,702,698 A | | 2/1955 | Snyder et al. |
| 2,736,352 A | | 2/1956 | Wright |
| 2,913,024 A | * | 11/1959 | Key ................................ 83/837 |
| 3,261,384 A | | 7/1966 | Henderson |
| 3,358,720 A | | 12/1967 | Henderson |
| 3,575,467 A | | 4/1971 | Davis |
| 3,818,561 A | | 6/1974 | Montana et al. |
| 3,945,289 A | | 3/1976 | Baez Rios |
| 3,977,447 A | | 8/1976 | Pease |
| 3,986,421 A | | 10/1976 | Schultz |
| 4,084,470 A | | 4/1978 | Reed |
| 4,557,172 A | | 12/1985 | Yoneda |
| 4,563,929 A | | 1/1986 | Ringlee et al. |
| 4,690,024 A | | 9/1987 | Chaconas |
| 4,738,291 A | | 4/1988 | Isley |

(Continued)

FOREIGN PATENT DOCUMENTS

| EP | 873808 | 10/1998 |
|---|---|---|
| JP | 59134612 | * 8/1984 |

OTHER PUBLICATIONS

International Search Report dated Apr. 29, 2008, issued in corresponding international application No. PCT/CA2008/000066.

(Continued)

*Primary Examiner* — Stephen Choi
(74) *Attorney, Agent, or Firm* — Ostrolenk Faber LLP

(57) ABSTRACT

A tooth is provided for a circular disc felling saw. When installed on a saw blade, the tooth has both leading and trailing cutting tips that cut the tree. The cutting discharge of the trailing cutting tips may tend to wear the rearward flank of the leading cutting tips. Either one or both of the primary and secondary cutting tips may include a wear insert, such as a ceramic wear insert.

20 Claims, 12 Drawing Sheets

U.S. PATENT DOCUMENTS

| | | | |
|---|---|---|---|
| 4,744,278 A | 5/1988 | Wright | |
| 4,750,396 A | 6/1988 | Gaddis et al. | |
| 4,765,217 A | 8/1988 | Ludwig | |
| 4,848,205 A | 7/1989 | Suzuki et al. | |
| 4,879,936 A | 11/1989 | Anderson | |
| 4,883,129 A | 11/1989 | Lonn et al. | |
| 4,932,447 A | 6/1990 | Morin | |
| 5,058,477 A | 10/1991 | MacLennan | |
| 5,085,112 A | 2/1992 | MacLennan | |
| 5,088,371 A | 2/1992 | MacLennan | 83/840 |
| 5,131,305 A | 7/1992 | MacLennan | 83/840 |
| 5,205,199 A | 4/1993 | MacLennan | |
| 5,209,611 A * | 5/1993 | Drescher | 407/48 |
| 5,303,752 A | 4/1994 | MacLennan | 144/34 |
| 5,307,719 A | 5/1994 | MacLennan | 83/839 |
| 5,481,952 A | 1/1996 | MacLennan | 83/839 |
| 5,644,965 A | 7/1997 | MacLennan | 83/842 |
| 6,601,495 B2 | 8/2003 | Cranna | |
| 6,725,758 B2 | 4/2004 | MacLennan | 83/839 |
| 6,810,783 B1 * | 11/2004 | Larose | 83/840 |
| 7,713,006 B2 | 5/2010 | MacLennan | 407/113 |
| 2002/0002892 A1 * | 1/2002 | DiSabatino | 83/835 |
| 2004/0244560 A1 * | 12/2004 | Krehel | 83/835 |
| 2007/0151430 A1 * | 7/2007 | MacLennan et al. | 83/13 |

OTHER PUBLICATIONS

Tankersley, Mike: "Southern Loggin' Times", Jun. 1992, Cover page and pp. 14-15, 44 and 45.

International Preliminary Report on Patentability, dated Aug. 4, 2009, issued in corresponding PCT International Application No. PCT/CA2008/000066.

* cited by examiner

SAW TOOTH FOR CIRCULAR SAW

CROSS REFERENCE TO RELATED APPLICATIONS

The present application is a 35 U.S.C. §371 National Phase conversion of PCT/CA2008/000066, filed Jan. 11, 2008, which claims benefit of U.S. Provisional Application No. 60/897,873, filed Jan. 29, 2007, the disclosure of which is incorporated herein by reference. The PCT International Application was published in the English language.

FIELD OF THE INVENTION

The present invention relates to saw teeth for circular saws.

BACKGROUND OF THE INVENTION

Saw teeth for circular saws of the type mounted on a feller head for a tree felling apparatus are known. U.S. Pat. No. 4,932,447, Morin, 1990, and U.S. Pat. No. 5,205,199, MacLennan, 1993, represent saw teeth that have become well known in the industry. Morin '447 and MacLennan '199 both teach a replaceable saw tooth with four sides. The teeth can be rotated when the active cutting tips and edges become dull or worn.

Saw teeth wear relatively quickly and may become rounded or dull. This may cause increased fuel consumption, decreased productivity, or poor cut quality, or all of them, and may tend to result in a need for maintenance. The cutting tips do the majority of the cutting of the tree fibers and even though the teeth may have large cutting tips, only a small area at the end of the tip is used. As the tip wears it may tend to become rounded and the tooth body immediately behind the end of the tip may then present the outermost part of the tooth. This portion of the tooth body may then contact the tree before, or rather than, the point of the rounded cutting tip. This may tend to result in increased friction and the tearing of tree fibers, instead of cutting the tree fibers with a shearing action. This may tend to consume more energy, decrease machine productivity and produce a rougher cut on the tree butt. A dull tooth may impose higher forces and stresses on the saw blade than a sharp tooth.

The outermost cutting tips of the teeth are also susceptible to damage from impact, such as when the teeth strike objects such as rocks and other debris during the felling of trees. This may also lead to a need for maintenance.

Some teeth have carbide wear plates with sharp corners at the cutting tips. These corners may tend to chip or break off easily when striking objects or debris. This may result in a loss of the cutting edge and in a loss of cutting efficiency. Other teeth may have flat plateaus at the cutting tips. These may be more durable but may become rounded or dull faster and may be less efficient at cutting tree fibers.

The use of a small radius as described herein by the present inventor may prevent this and may result in a more durable carbide tip while still retaining a relatively sharp point to have efficient cutting.

SUMMARY OF THE INVENTION

In an aspect of the invention there is a tooth assembly for releasable mounting to a circular saw disc. The tooth has a body with a mounting end and a front end distant from the mounting end; at least one primary cutting tip mounted at the front end; and at least one secondary cutting tip, mounted in a trailing position to the at least one primary cutting tip.

The tooth may be a tooth for a feller buncher saw for cutting timber. In a feature of that aspect of the invention, at least one of the primary cutting tip and the secondary cutting tip includes a wear member. In a further feature, the wear member is a ceramic insert. In another feature, as manufactured, the secondary cutting tip is one of (a) flush with; and (b) proud of, the primary cutting tip. In an alternate feature, the secondary cutting tip is one of (a) flush with; and (b) shy of, said primary cutting tip. In still another feature, the tooth assembly has more than one primary cutting tip, and the tooth assembly is removable and repositionable relative to the circular saw disc to present a different one of the primary cutting tips to a workpiece to be cut. In a yet further feature the primary cutting tip is at least partially self-resharpening. In still another feature, the primary cutting tip has a rearwardly trailing flank, the rearwardly trailing flank being located in a leading position relative to the secondary cutting tip, and the secondary cutting tip has a discharge directed to pass cuttings across the trailing flank of the primary cutting tip. In yet again a further feature, the tooth has four primary cutting tips and four secondary cutting tips and the body is substantially square in section. In a further feature, the square body is rearwardly tapering from a broad front end to a narrower rear end. In another feature the tooth has four ceramic wear inserts, each mounted to a respective one of the cutting tips. In still yet again another further feature, each of the secondary cutting tips includes a ceramic wear insert. In a still further feature, the ceramic wear inserts of the secondary cutting tips co-operate to extend about at least ¾ of the body of the tooth. In another alternate feature, the tooth includes at least one tertiary cutting tip located in a trailing position relative to a corresponding secondary cutting tip. In a further feature of that alternate feature, at least one of said primary, secondary and tertiary cutting tips has a wear insert. In still another alternate feature, the tooth is selected from the group of teeth consisting of (a) teeth having a round circumferential cutting edge; (b) teeth having only primary two cutting tips; and (c) teeth having a generally triangular body shape when viewed from in front.

These and other aspects and features of the invention may be understood by considering the accompanying illustrations and the detailed description provided herein below.

BRIEF DESCRIPTION OF THE DRAWINGS

FIG. 2b is a top view of the tooth of FIG. 2a;

FIG. 2c is a front view of the tooth of FIG. 2a;

FIG. 4a is a perspective view of an alternate embodiment tooth to that of FIG. 2a;

FIG. 4b is a top view of the tooth of FIG. 4a;

FIG. 4c is a front view of the tooth of FIG. 4a;

FIG. 5a shows a detail, similar to that of FIG. 2e, of a further alternate embodiment of saw tooth to that of FIG. 2a;

FIG. 5b shows a detail, similar to that of FIG. 2e, of a further alternate embodiment of saw tooth to that of FIG. 2a;

FIG. 5c shows a detail, similar to that of FIG. 2e, of a further alternate embodiment of saw tooth to that of FIG. 2a;

FIG. 6a is a perspective view of an alternate embodiment of tooth to that of FIG. 2a;

FIG. 6b is a top view of the tooth of FIG. 6a;

FIG. 6c is a front view of the tooth of FIG. 6a;

FIG. 6d is a side view of the tooth of FIG. 6a;

DETAILED DESCRIPTION

Figure 1A:
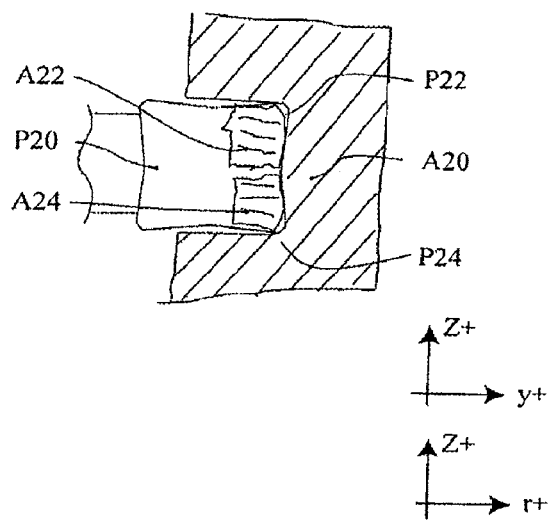
FIG. 1a is a section of sharp prior art tooth, as the tooth cuts a tree, looking toward the front of the tooth.

The description that follows, and the embodiments described therein, are provided by way of illustration of an example, or examples of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

It may be helpful to identify co-ordinate systems that may aid in understanding the present invention. At the largest level, there may be a cylindrical polar co-ordinate system, in which the axial, or x-direction is defined by the axis of rotation of a feller buncher disc saw blade. The circumferential direction is that through which angles, angular velocity, and angular accelerations, (typically θ, ω, and α) may be measured, most often from an angular datum, or angular direction, in a plane perpendicular to the axial direction, and a radial direction. The radial direction is defined in the plane to which the axial direction is normal, extending away from the axial centerline of the disc. At a more local scale, that of an individual tooth, there may be an x direction, defined as being the distance in the direction of advance of the tooth into the wood that it is cutting, that direction being, instantaneously, the circumferential direction of the disc, and the velocity being the angular velocity at that radius. The y-direction is the perpendicular direction, namely the direction of advance into the tree of the axis of rotation of the disc on which the tooth is mounted. The z-direction is the mutually perpendicular direction, across the width of the cutting face of the tooth, which, for a straight, upstanding tree is also, approximately, the vertical axis.

Figure 1C:
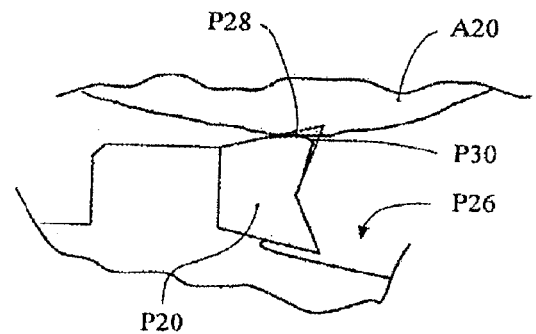
FIG. 1c shows the tooth of FIG. 1a in a worn condition, from the same view as FIG. 1b.
Figure 1B:
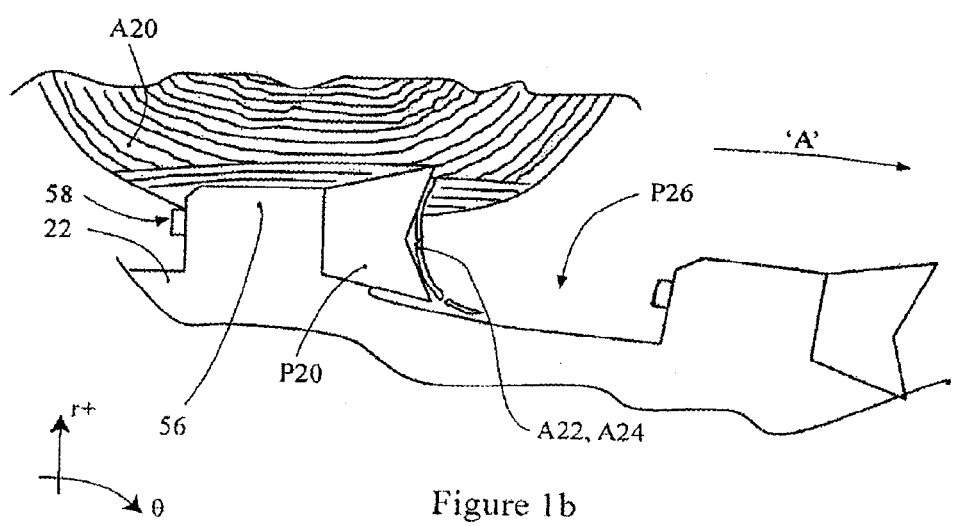
FIG. 1b is a view looking downward on the tooth of FIG. 1a as it cuts the tree.

FIG. 1a shows a prior art tooth P20 with sharp outermost front cutting tips P22 and P24 in the process of cutting portions of a tree A20. The tree fiber or chips being cut are indicated as A22 and A24. Tooth P20 has four cutting tips at the front end of the tooth. The two outermost cutting tips P22 and P24 at the front end do the majority of the cutting of the tree fibers. Although tooth P20 has relatively large cutting tips, only a small area at the end of the tip tends to be used. As the tip wears it has a tendency to become rounded and the tooth body immediately behind the end of the tip becomes the outermost part of the tooth. It may tend to contact the tree before the dull or the rounded cutting tip. This may result in greater friction, and in a tendency to tear tree fibers instead of cutting them with a shearing action. FIG. 1b shows tooth P20 from above, with sharp outermost front cutting tip P22 shearing the tree fibers, perhaps relatively cleanly, with cutting chips A22 and A24 turning into (and out of) gullet P26. FIG. 1c shows the prior art tooth P20 in a worn condition with a dull or rounded outermost front cutting tip P22 making contact with tree A20 along the unsharpened outside face, as at P28, rather than on the intended edge of the dulled leading edge portion P30. The original profile of the sharp cutting tip P22 is shown in dashed line, which corresponds to the shape of the tooth as shown in FIG. 1b.

Figure 2A:
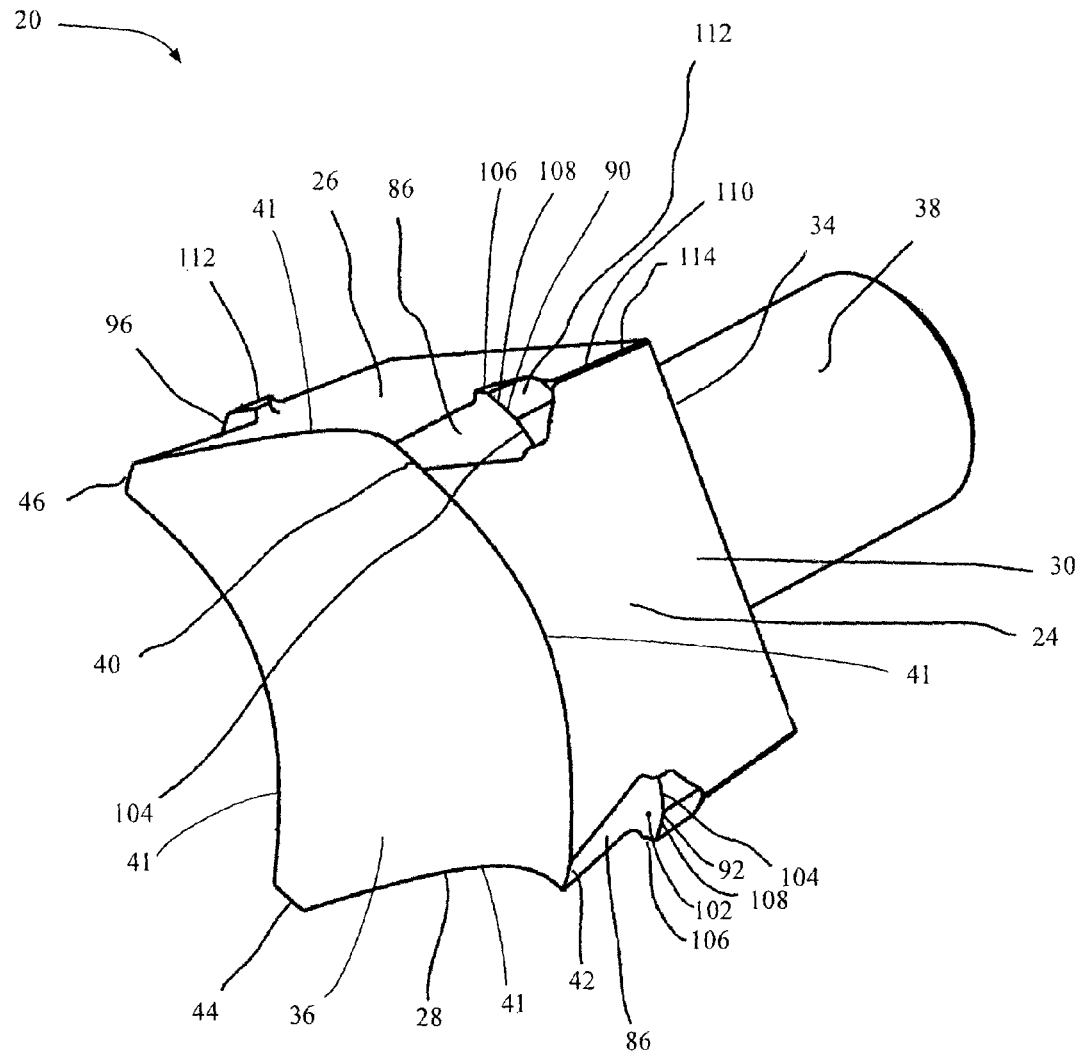
FIG. 2a is a perspective view of an example of a saw tooth according to an aspect of the present invention.
Figure 2B:
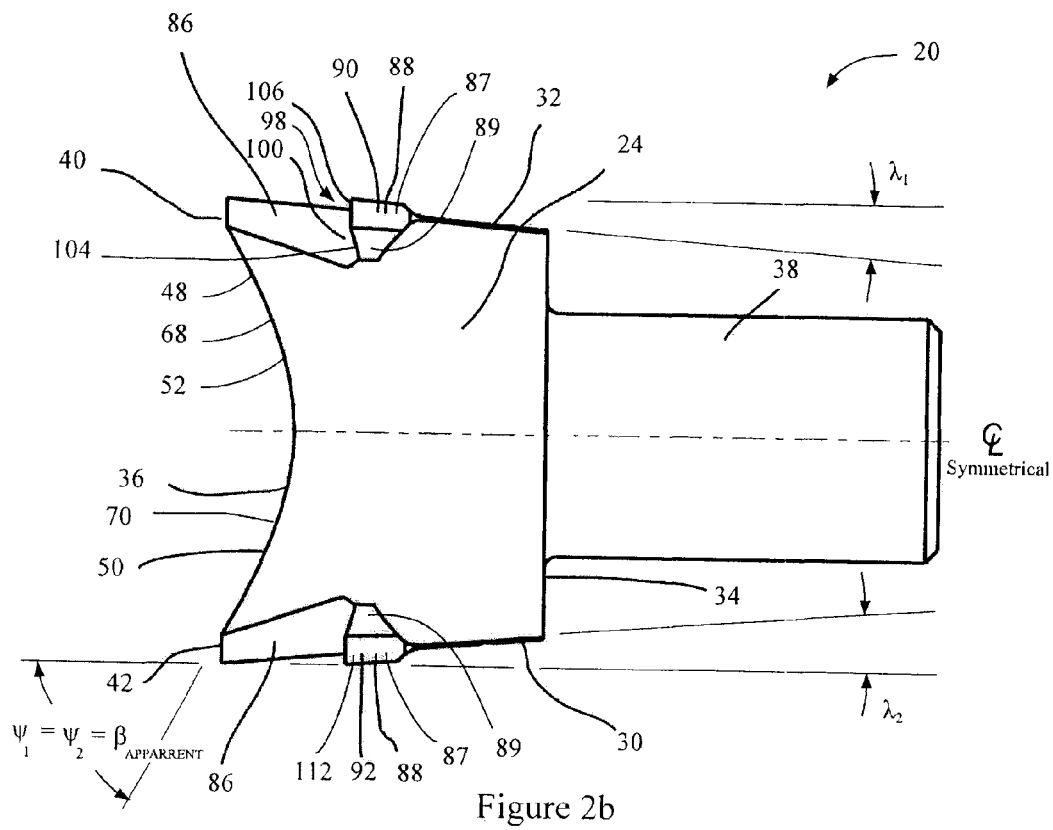
Figure 2C:
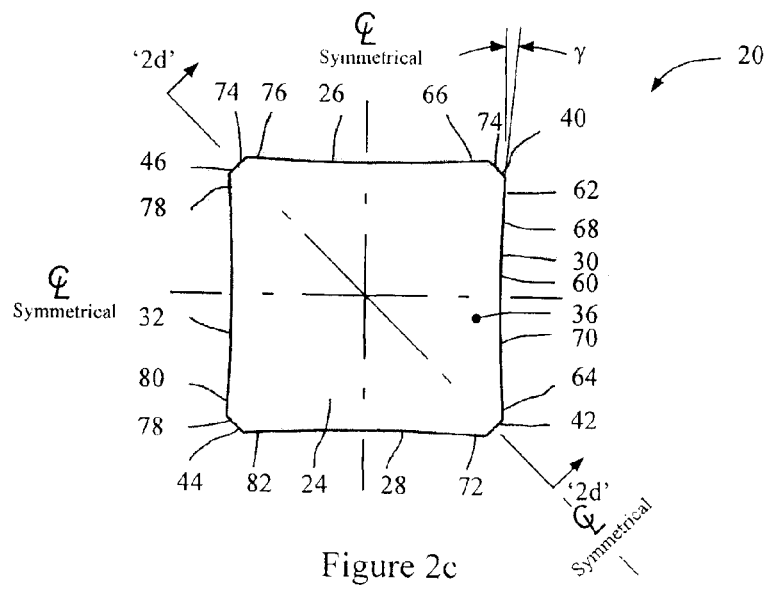
Figure 2D:
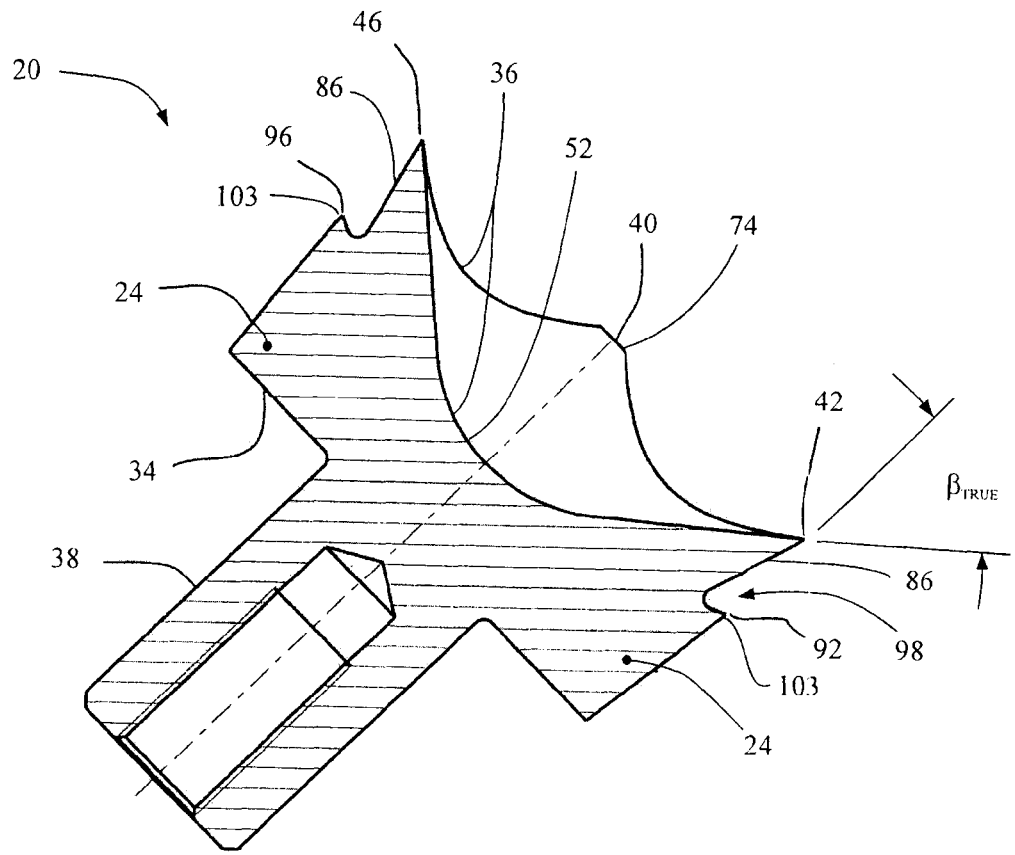
FIG. 2d is a view of on section '2d-2d' of FIG. 2c.
Figure 2E:
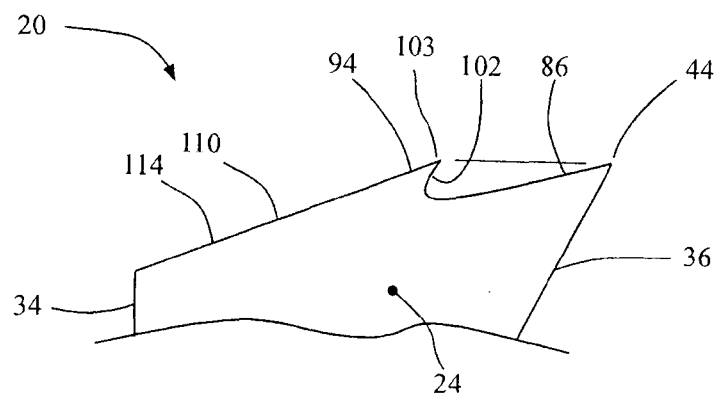
FIG. 2e shows an enlarged detail of the tooth of FIG. 2d.
Figure 3A:
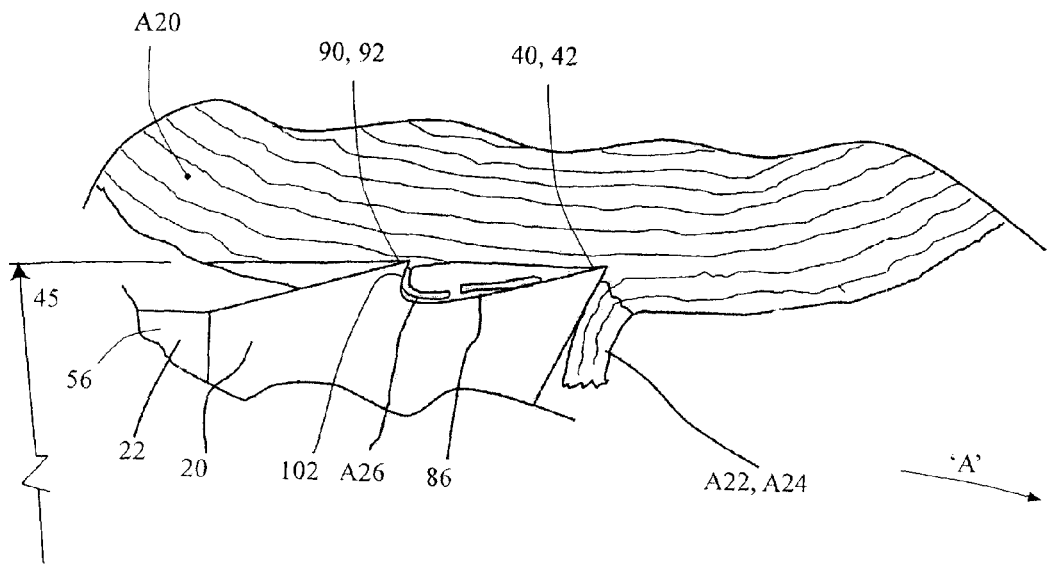
FIG. 3a shows a view the tooth of FIG. 2a during cutting of a tree.

FIG. 2a is a perspective view of an embodiment of tooth or tooth assembly, referred to as tooth 20 for mounting on a disc saw blade 22 (FIG. 3a). Saw blade 22 has the general form of a disc, and is mounted to be driven about an axis of rotation in the direction indicated by arrow 'A'. Tooth 20 has a body 24 that has lateral sides 26, 28, an outer side 30, an inner side 32, a mounting end, stop, abutment, or shoulder 34; a front, or cutting end 36. A shank 38 may extend from the mounting end or shoulder 34 in a direction away from cutting end 36, and may seat in a corresponding accommodation, or socket, in blade 22. To the extent that tooth 20 is symmetrical about both its vertical and horizontal central planes, as indicated in FIG. 2c, it is arbitrary which sides are designated as lateral, inner, or outer. Being symmetrical, tooth 20 may be installed on blade 22 in any of four orientations, and may be rotated accordingly when the various tips become worn. When seen from in front, as in FIG. 2c, and from above as in FIG. 2b, the intersection of the front end 36 with the lateral sides 26, 28 and the outer side 30 form two cutting tips 40, 42 at the outermost radius 45 (i.e., on the outermost circumferential periphery of a saw blade 22). Tips 40, 42 may be designated as upper and lower, or first and second cutting tips. Lateral sides 26, 28 extend from cutting tips 40, 42 toward inner side 32 at which there are a further two cutting tips 44 and 46. Inner portion 48 of the front end 36 is angled toward the direction of rotation of the disc as indicated at angle β (apparent) and is joined to the outer portion 50 of front end 36 with a radius, as at 52, to encourage a relatively smooth flow of chips from the cutting tips to the adjacent gullet P26 of the disc saw blade 22. True angle β is seen in FIG. 2d, and may be in the range of 35 to 55 degrees, and, in one embodiment, may be about 45 degrees. Both the inner and outer tangential portions 48, 50 of front end 36 lying to either side of radius 52 may be angled, and, while the angles may not be equal, in one embodiment they are equal, or substantially equal, both being angle β. The inner side 32 of the tooth body may abut the radially outwardly facing circumferentially extending portion of blade 22 adjacent gullet P26, and, given the planar relationship of the two parts, may tend to act as a seat on the disc to prevent rotation. Shank 38 may seat in a female socket formed in lug 56 of blade 22, lug 56 defining the radial extremity of the disc portion of blade 22. Shank 38 may be shorter than the circumferential extent of lug 56, and may be threaded internally, such that it may receive a threaded fastener 58, such as a cap screw, and may be secured in place accordingly.

FIGS. 2b to 2c show tooth 20 in detail, as uninstalled. The intersection of front end 36 with the lateral sides 26, 28 and the outer side 30 form the two cutting tips 40, 42 at outermost radius $R_1$ of saw blade 22. Outer side 30 may itself be centrally relieved as at 60, having a valley shape between two flank portions 62, 64 that are angled as at angle γ, as seen in FIG. 2c, and in which the leading edges of those flank portions are rearwardly relieved or raked at angles $\phi_1$ and $\phi_2$, which may be equal in magnitude, as seen best in FIG. 2b. In this geometry there are four cutting edges 66, 68, 70 and 72, 66 and 72 being the leading cutting edges of sides 26 and 28 respectively, and edges 68 and 70 being the upper and lower leading edges of portions 62 and 64 of radially outer side 30. In addition to the inward, rearwardly running cutting tip rake angle as at $\phi_1$ and $\phi_2$, tips 40, 42 are also rearwardly relieved on external side 30. Further still, lateral sides 26, 28 may be rearwardly relieved in the direction of cirumferential motion, as indicated by rake angle $\lambda_1$ and $\lambda_2$. It may be convenient for $\lambda_1$ and $\lambda_2$ to be equal. The outer edges of tips 40, 42 are diagonally bevelled, or chamfered, as at 74.

In this embodiment there is a tooth assembly, (e.g., tooth 20), for a cutting saw blade 22. The tooth assembly is releasably mounted to the periphery of a circular saw disc by fastener 58. Tooth 20 includes a body that may diverge in the circumferentially forward direction (on relief angles $\lambda_1$ and $\lambda_2$ as seen looking in the radial direction as in FIG. 2b), one outer side 30, that diverges circumferentially forwardly (or longitudinally forwardly, as may be) on relief angle η, and one inner side 32. The intersection of the front end 36 with the lateral sides and the outer side form two cutting tips 40, 42 and four cutting edges 66, 68, 70, and 72, the front end 36 being concave, with a cylindrical shank 38 attached to the mounting end 34 of the tooth body 24 extending generally along a tangential axis to the disc (the x-axis in terms of the tooth), the shank being threaded to provide a fitting in the nature of an attachment, or attachment means, by which to secure tooth 20 to the circular saw disc. Similarly, the intersection of the front end with the lateral sides and the inner side 32 form two cutting tips 44, 46 and four cutting edges 76, 78, 80, and 82. When tips 40 and 42 are worn, tooth 20 may be extracted, and rotated 180 degrees, to present tips 44 and 46 to the material to be cut.

As may be noted, tips 40, 42, 44 and 46 are all rearwardly relieved as described above. In addition to the customary relief, tips 40, 42, 44 and 46 may be circumferentially rearwardly (or longitudinally rearwardly) relieved along what would otherwise be the vertex between the upper and side, or lower and side, faces. For example, tooth 20 has rearward corner reliefs 74, where the corner is chamfered rearwardly on a generally triangular chamfer face 86 that is narrow near tip 40 (or 42, or 44 or 46, as may be), and more broad rearwardly distant therefrom and may be considered to be the rearwardly trailing flank of the primary tip. Some distance abaft of cutting tips 40, 42, 44 and 46, tooth 20 has another set or array of cutting members 88, which may be referred to as teeth or as auxiliary cutting members 90, 92, 94 and 96. A gullet 98 of these secondary or auxiliary cutting tips is formed at the broader, deeper base 100 of curved chamfer face 86, where the secondary teeth have a hollowed out face, 102 that may form a curved surface for turning wood fiber chips as they are cut from the tree. The outer and upper edges 104, 106, (or outer and lower edges, as may be), of face 102 are cutting edges which run into each other at radiused corner cutting tips 108. Body 24 of tooth 20 may be relieved rearwardly of the secondary teeth as at 110, either on a continuation of the plane (or planes) of relief of the primary teeth rearwardly of tips 40, 42, 44, 46, or on a sharper smooth slope. In the example of FIGS. 2b and 2c, secondary teeth 90, 92, 94, 96 are set in, or have the form of, outwardly protruding blisters 112, such that the cutting edges 104, 106 stand either axially or circumferentially proud, respectively, of the adjacent readwardly relieved faces 30 (outer), 32 (inner), 26 (upper), 28 (lower), and tips 90, 92, 94 and 96 stand diagonally proud of the line of the vertex 114 of the junction of those respective faces.

Figure 3B:
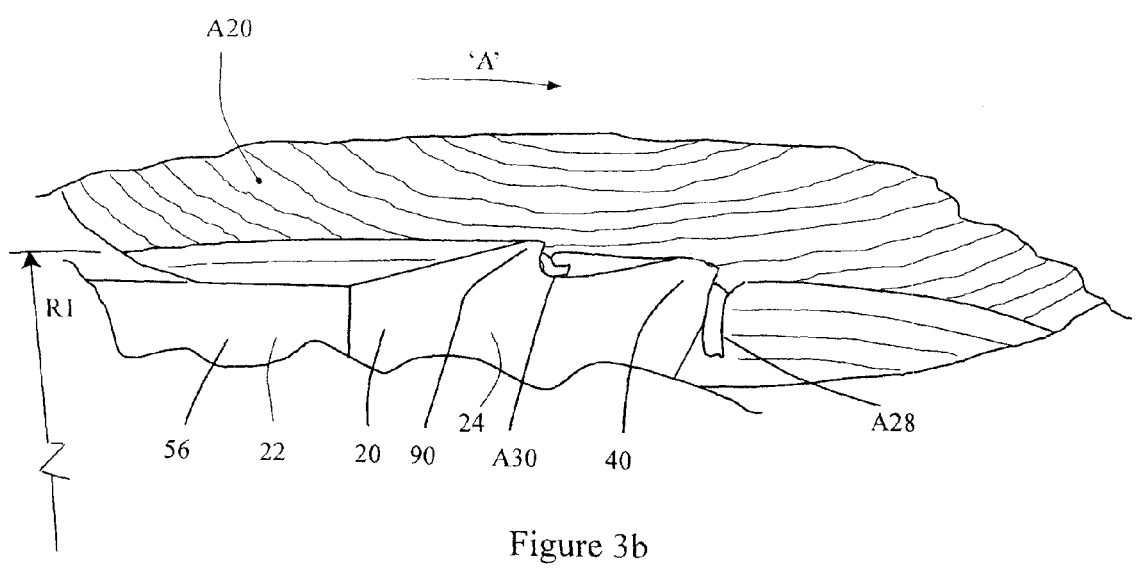
FIG. 3b shows an enlarged detail of the tooth of FIG. 3a in a worn condition.

FIG. 3a shows tooth 20 with new or sharp outermost cutting tips 40 and 42 in operation, shearing tree fibers. In the as-new or sharp condition, the outermost front cutting tips 40, 42 at the front end do the majority of the cutting of the tree fibers, cutting thicker portions of tree fiber or chip A22 while the secondary outermost cutting tips 90, 92 cuts less tree fiber, cutting thinner chips A26 due to the close proximity of the two cutting tips 40 and 90 (or 42 and 92, as may be) on the tooth compared to the larger distance between the front tip 40 of one tooth to the secondary tip 90 of the preceding tooth. FIG. 3b shows tooth 20 in a slightly worn condition. As tooth 20 is used and begins to wear, the majority of the wear occurs at the front outer cutting tips 40, 42 causing them to become rounded. This may tend to leave the relatively sharp secondary cutting tips 90, 92 as the outermost part of the tooth. In this example, the outermost front cutting tips 40, 42 at the front end do less cutting of the tree fibers than in their new or sharp condition, cutting a thinner chip than previously A28, while relatively sharp secondary cutting tips 90, 92 cuts more tree fiber, cutting a thicker chip than previously A30. As tooth 20 continues to be used secondary cutting tips 90, 92 may tend also to wear.

Tooth 20 may have a self-sharpening feature or tendency in operation. FIG. 1b shows chips that are formed by the outer front cutting tips as the tree fibers are cut, and that are pushed down the front face of the cutting tips into the recessed front and then into the gullet 54. Similarly, FIG. 3 shows that as the secondary cutting tip 90 cuts tree fibers, chips A30 are formed and pushed down along the radius in front of the secondary tip 90 and forward over the back side (i.e. initially face 86) of the front cutting tip 40. This chip flow may tend to wear the back side of front tip 40, and may result in sharpening of front tip 40.

As noted above, the outer front two cutting tips are susceptible to damage from impact when the teeth strike objects such as rocks and other debris during the felling of trees. This damage can destroy or dull the outer front two cutting tips such that they are no longer sharp and are no longer the outermost parts of the tooth. This may result in inefficient cutting and may require the replacement or rotation of the tooth. However, as described, tooth 20 has a secondary cutting tip 90 behind, or shielded by, the front cutting tip 40. In some instances of unintentional contact with objects, outermost front cutting tip 40 may be damaged and secondary cutting tip 90 may be left intact and in an undamaged condition. This allows the cutting to continue by way of the secondary cutting tip without having to replace or rotate the tooth as soon as might otherwise be the case. To that extent tooth 20 may tend to be somewhat more tolerant of impact with objects such as rocks and other debris during the felling of trees than it might otherwise be.

Use of tooth 20 may tend to improve the quality of cut since the secondary cutting tips share in the cutting of tree fibers. In a sense, the number of active cutting tips is increased by 100% compared to prior art teeth. This may result in a smoother surface on the butt of the tree which may tend to be desirable in sawmilling operations.

Tips 90, 92, 94 and 96 may be made of steel, or they may be made of, or include, ceramic inserts, such as tungsten carbide. Such an embodiment of tooth 120 is shown in FIGS. 4a to 4d. Tooth 120 is substantially similar to tooth 20. However, tooth 120 employs carbide inserts 122 for the primary cutting tips 140, 142; and carbide inserts 124 for the secondary cutting tips. The carbide inserts of tooth 120 may be seen in contrast to those of FIG. 1 of U.S. Pat. No. 6,725,758 in which there are carbide wear plates with sharp corners at the cutting tips. In the view of the present inventor, sharp corners may be more prone to chip or break off easily when striking objects or debris. This may cause loss of the cutting edge at the broken cutting tip. Tooth 120 uses the small radii 126, 128 to discourage or prevent chipping of the carbide tips while still retaining a relatively sharp point. The carbide inserts 122 of the primary tips, and 124 of the secondary tips may be brazed in place. The primary inserts may be substantially planar, and may be inclined at an angle, analogous to angle beta, as the true cutting angle. The front end 136 of tooth 120 may include a radiused central portion, as in tooth 20, or may include a flat central plateau 138. A carbide insert wear member may be brazed to, and form the wear surface of, plateau 138.

In summary, FIGS. 2a-2e, 3a and 3b illustrate a saw tooth 20 that has a body 24 that has four flat divergent lateral sides 26, 28, 30 and 32. At the vertices, rearward of the primary cutting tips tooth 20 has secondary cutting tips having four intermediate arcuate surfaces 87 on an arcuate chamfer symmetrical along each vertex, and eight flat intermediate flank surfaces 89, in pairs to either side of surfaces 87, the flat surfaces being machined with a milling machine. The four forward curved surfaces 86, are machined on a lathe. The mounting end, stop, abutment, or shoulder 34; and the recessed front or cutting end 36 are machined surfaces that in some embodiments may be formed on a lathe.

As noted above, shank 38 may extend from the mounting end or shoulder 34 in a direction away from cutting end 36, and may seat in a corresponding accommodation, or socket, in the saw blade. The body 24 is typically made of steel. When seen from in front, as in FIG. 2c, and from above as in FIG. 2b, the intersection of the front end 36 with the flat lateral sides form four front or primary cutting edges 41. The intersection of the four forward curved surfaces 86 and the four flat intermediate surfaces 87 and adjacent flat surfaces 89 form four intermediate or secondary cutting edges 103. There are eight curved surfaces made by the milling cutter, joining the flat lateral sides to the eight flat intermediate surfaces.

The recessed front or cutting end 36 is angled toward the direction of rotation of the disc as indicated at angle β. The front end 36 has a radius such as may encourage a relatively smooth flow of chips from the cutting tips to the gullet (e.g. P26) of the disc. Angle β may be in the range of 35 to 55 degrees, and, in one embodiment, may be about 45 degrees. The recessed front may also be accomplished by milling four flat faces at an angle β, where angle β may be in the range of 35 to 55 degrees. Tooth 20 may have a concave recess on front end 36, which is turned on a lathe. Alternatively, in other embodiments there may be four flat, angled faces similar to the front face of a Quadco beaver tooth.

Wear plates 122 and 124 are added to encourage longer life of the cutting edges in abrasive conditions. The wear plates may be made of a hardened material such as tungsten carbide and brazed, soldered or otherwise suitably secured to the seats of the body of tooth 120.

Figure 4A:
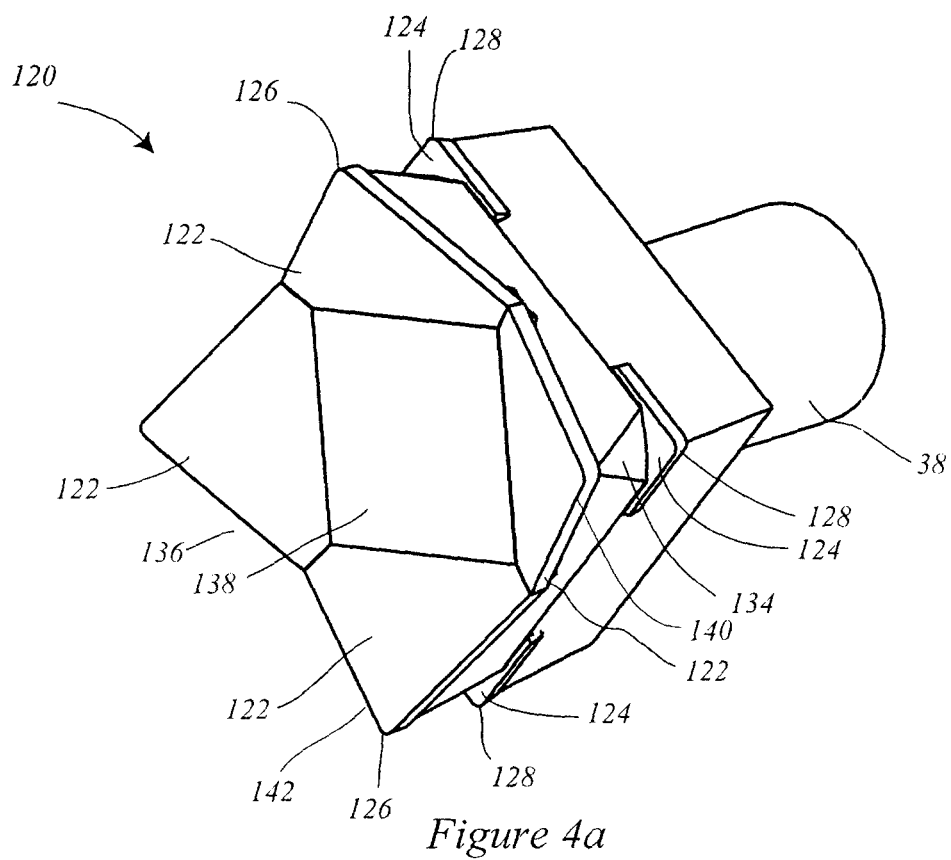
Figure 4B:
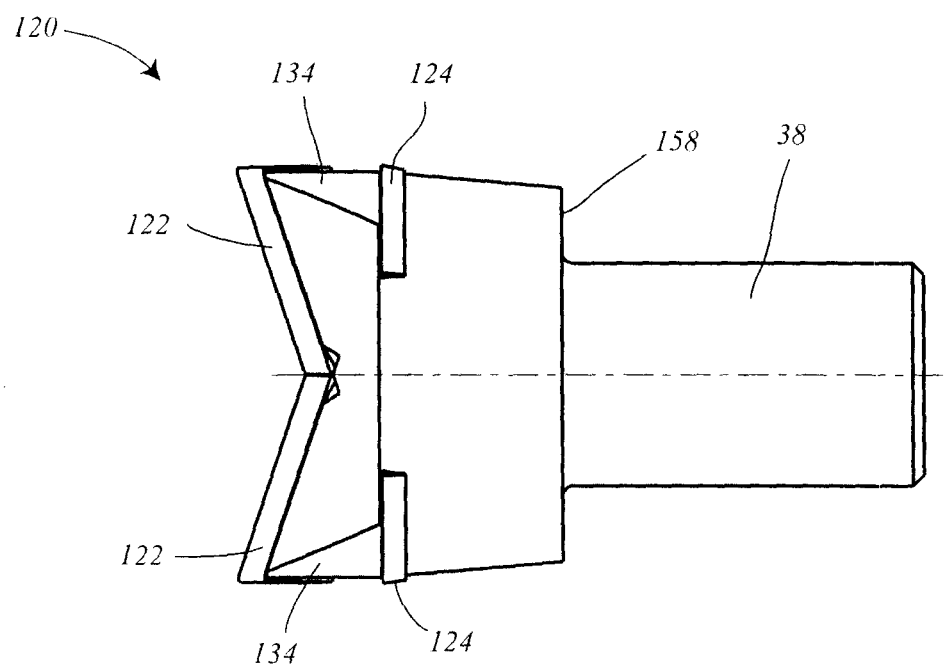
Figure 4C:
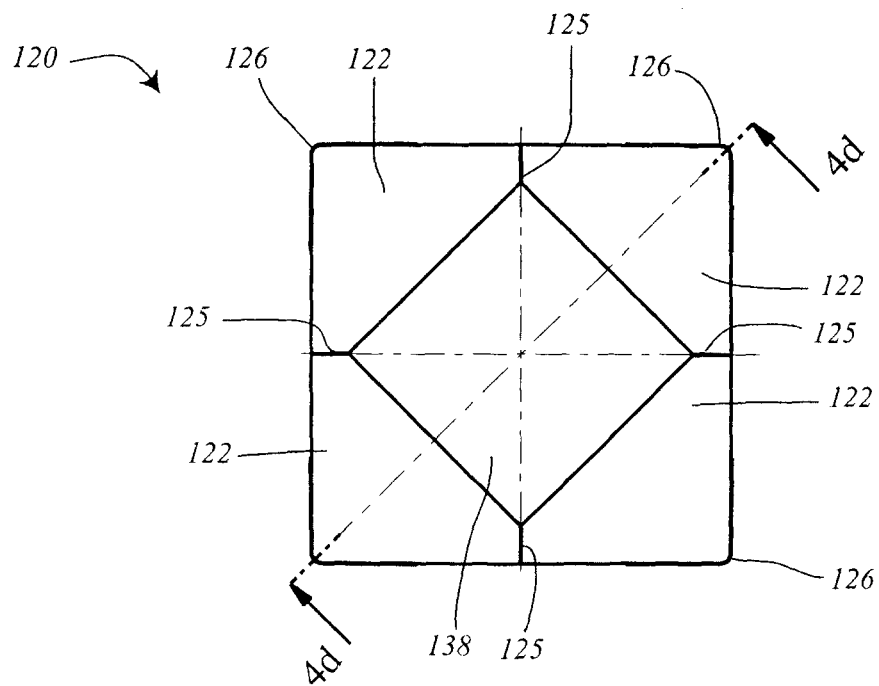
Figure 4D:
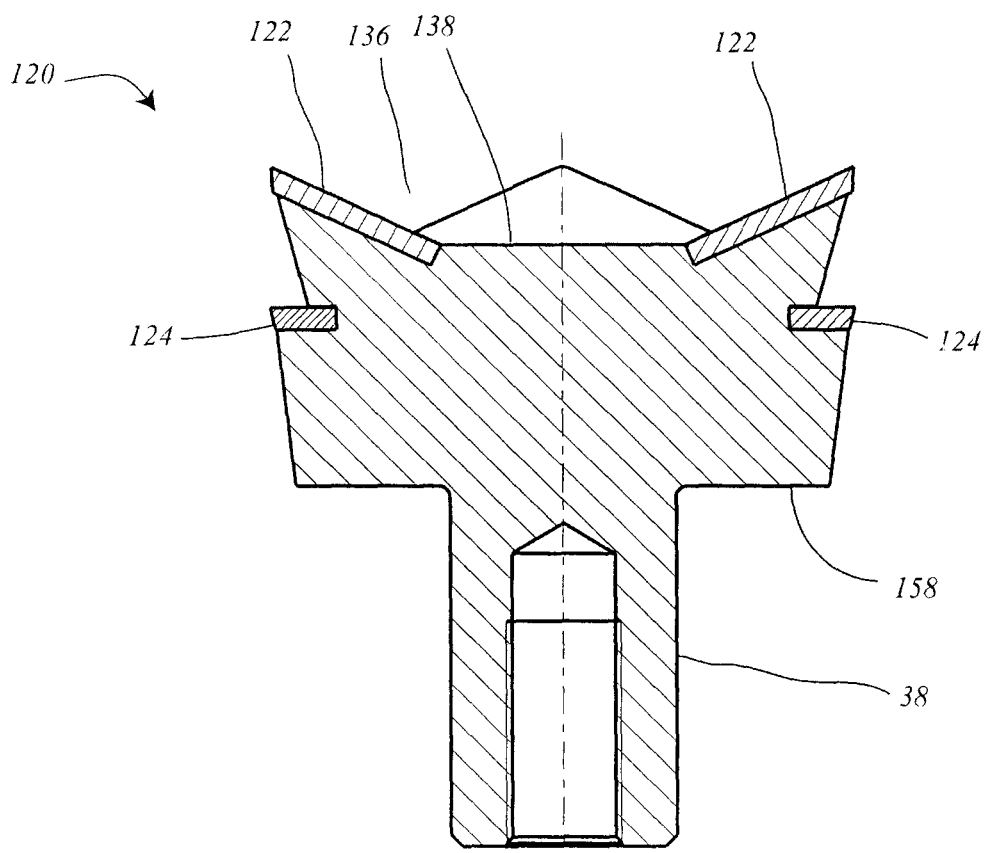
FIG. 4d is a view of on section '4d-4d' of FIG. 4c.
Figure 4E:
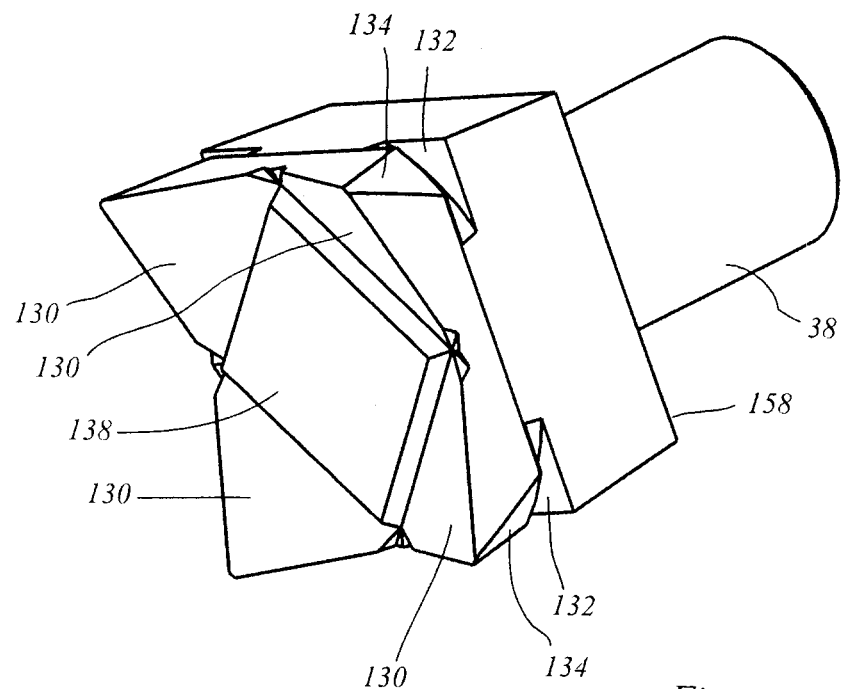
FIG. 4e shows the tooth of FIG. 4a prior to installation of wear inserts.
Figure 4F:
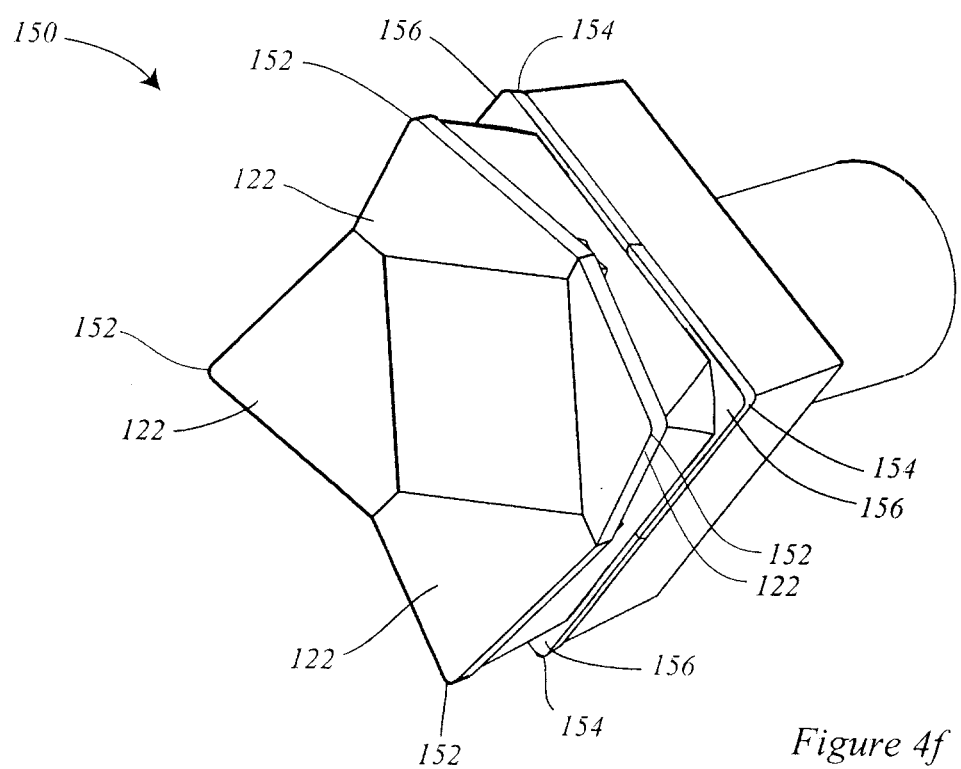
FIG. 4f shows an alternate embodiment of the tooth of FIG. 4a in which the secondary tips have an array of wear inserts extending thereabout.

Summarizing again, FIGS. 4a-4e illustrate a tooth 120 that includes a body having four flat divergent lateral sides, four flat forward lateral sides, four front surfaces or seats 130 for the wear plates 122, four flat intermediate surfaces or seats 132, the flat surfaces machined with a milling machine; four forward curved surfaces 134, machined on a lathe; a mounting end, stop, abutment, or shoulder 158 machined on a lathe; a recessed front or cutting end 136 with a flat surface 138. A shank 38 may extend from the mounting end or shoulder 158 in a direction away from cutting end 136, and may seat in a corresponding accommodation, or socket, in blade 22. The body of tooth 120 may be made of steel. The recessed front or cutting end 136 is angled toward the direction of rotation of the disc as indicated at angle β and abuts the flat surface 138, to encourage a relatively smooth flow of chips from the cutting tips to the gullet of the disc. Angle β may be in the range of 35 to 55 degrees, and, in one embodiment, may be about 45 degrees. Although the forward surfaces of wear plates 122 and 124 are shown flat and abutting each other they can be made curved or contoured to vary the angle β and to improve life. Similarly while adjacent wear plates 122 are shown abutting where they intersect at their ends 125, they can be made to overlap at their intersection to improve life. Similarly, FIG. 4f shows a tooth 150 having primary cutting tips 152 and secondary cutting tips 154. Primary cutting tips 152 may have wear members, such as ceramic insert wear members 122. Secondary cutting tips 154 may have wear members, which, again may be ceramic inserts, identified as 156, which may be brazed in place. In this embodiment, the array of inserts 156 cooperate to provide more than ¾ of the periphery, or may provide all, or substantially all of the periphery of tooth 150 with a cutting edge at the section of the secondary tips. Inserts 156 may be mutually abutting, or overlapping, as may be, in a manner similar to wear plate inserts 122. FIG. 4f is intended to be generally representative of teeth in which the secondary cutting tips, or members, include secondary cutting elements or edges that extend about all or substantially all of the periphery of the tooth. In some embodiments those peripherally extending cutting edges or tips may include ceramic inserts, as described. In other embodiments they may include steel edges or tips.

Figure 5A:
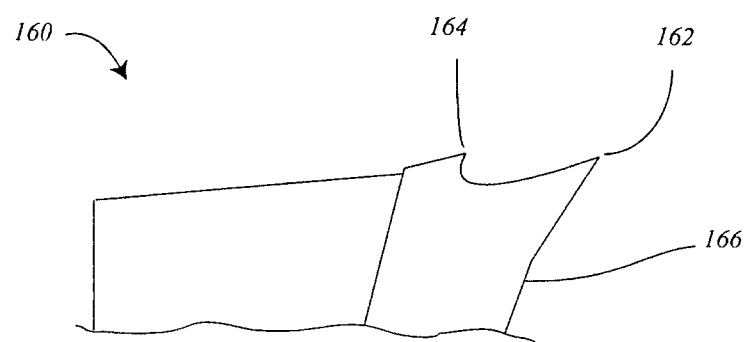

FIG. 5a shows another embodiment of tooth, 160 in which both the front cutting edge 162 and the additional cutting edge 164 are portions of a single ceramic insert, identified as wear plate 166.

Figure 5B:
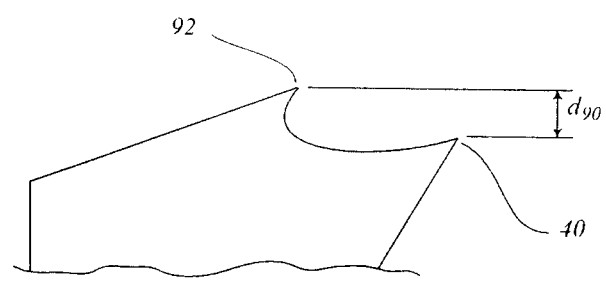
Figure 5C:
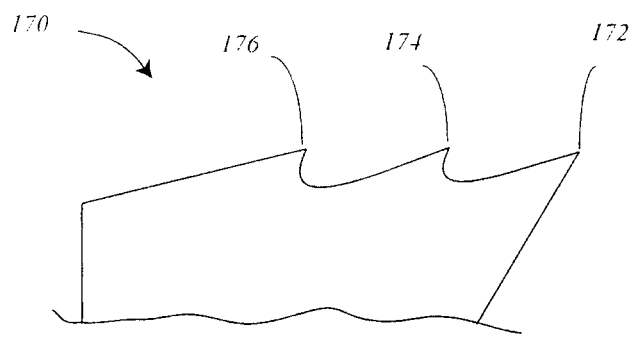

In each of the embodiments herein, the primary and secondary cutting tips and edges may be at the same "height", i.e., the height being the overall installed radial distance from the center of rotation. Alternatively the additional cutting tips and edges may be initially either higher or lower than the front cutting tips and edges. For example, FIG. 5b shows the additional cutting tips and edges 92 higher (in operation radially proud of the cut of) the front cutting tips and edges 40 by a distance $d_{90}$. FIG. 5b is intended to represent generically the case in which the successive tips are at unequal distances from the center of rotation, and encompasses the possibility of a secondary tip being shy of the sweep of the initially sharp primary cutting tips, and exposed for cutting only after the primary tip is worn. FIG. 5c shows a cross section of another embodiment of tooth, 170 having with a front cutting edge 172, an intermediate cutting edge 174, and a rear cutting edge 176. Tooth 170 is intended to be a generic representation of teeth having multiple cutting edges, be it three cutting edges or more.

Figure 6A:
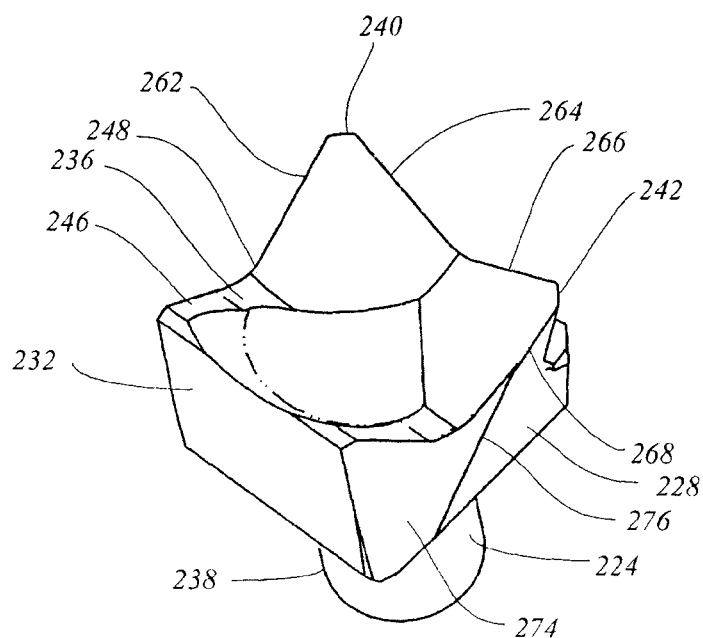
Figure 6B:
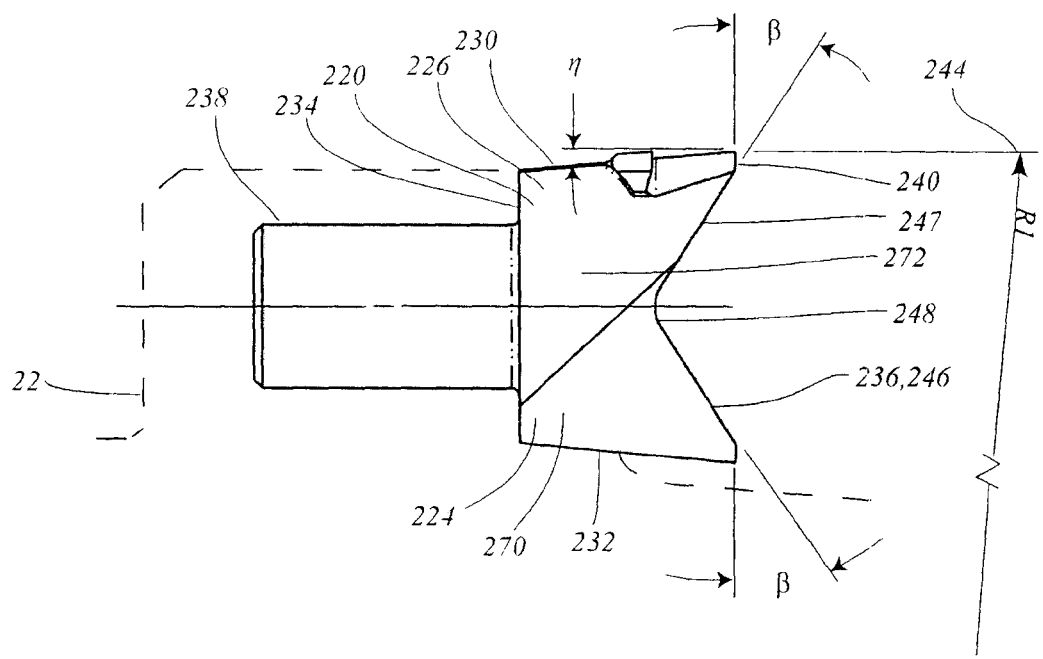

FIG. 6a shows an embodiment of tooth or tooth assembly, referred to as tooth 220. Tooth 220 is substantially the same as shown and described in FIGS. 5-8 of my co-pending U.S. Provisional patent application Ser. No. 60/854,065 filed Oct. 25, 2006, but differs therefrom to the extent of having both primary and secondary cutting tips as shown and described herein. That is, tooth 220 has a body 224 that has lateral sides 226, 228, an outer side 230, an inner side 232, a mounting end, stop, abutment, or shoulder 234; a front, or cutting end 236. A shank 238 may extend from the mounting end or shoulder 234 in a direction away from cutting end 236. When seen from in front, as in FIG. 6c, and from above as in FIG. 6b, the intersection of the front end 236 with the lateral sides 226, 228 and the outer side 230 form two cutting tips 240, 242 at the outermost radius 244 (i.e., on the outermost circumferential periphery of the saw blade). Tips 240, 242 may be designated as upper and lower, or first and second cutting tips. Lateral sides 226, 228 are angled from cutting tips 240, 242 toward inner side 232. The inner portion 246 of the front end 236 is angled toward the direction of rotation of the disc as indicated at angle β and is joined to the outer portion 247 of the front end with a radius, as at 248, to encourage a relatively smooth flow of chips from the cutting tips to the gullet of the disc. Angle β may be in the range of 35 to 55 degrees, and, in one embodiment, may be about 45 degrees. Both the inner and outer tangential portions of front end 236 lying to either side of radius 248 may be angled, and, in one embodiment the angles are equal, or substantially equal, both being angle β. The inner side 232 of the tooth body may abut the radially outwardly facing circumferentially extending portion of the blade adjacent the gullet and, given the planar relationship of the two parts, may tend to act as a seat on the disc to prevent rotation.

Tooth 220 is relieved on both its upper and lower portions, such as to have (when installed) a radially inwardly diminishing profile, with a correspondingly diminishing through thickness, or height, in this instance on a tapered angle as indicated by taper angle $\alpha_1$ or $\alpha_2$. In the general case, $\alpha_1$ need not be of the same magnitude as $\alpha_2$, although it may be convenient for them to be the same. The taper may be thought of as being a transverse taper relative to the forward direction of motion of the tooth. This may tend to result in a more efficient cut, less loss of blade speed and energy, reduced fuel consumption and increased productivity.

Figure 6C:
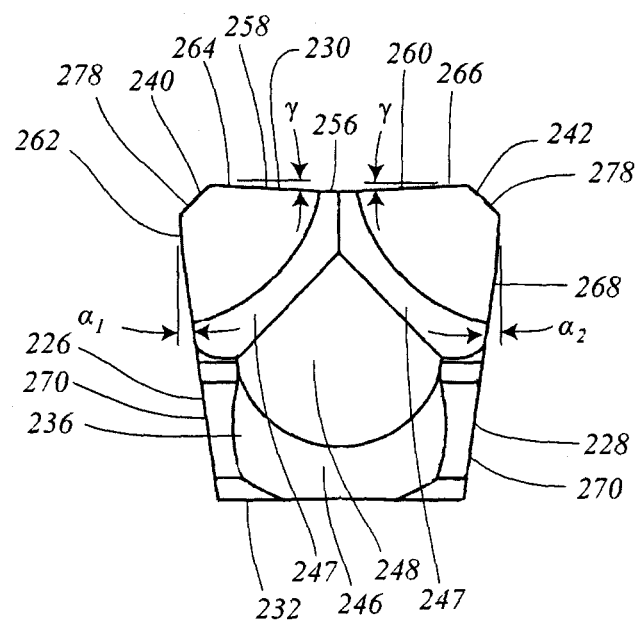
Figure 6D:
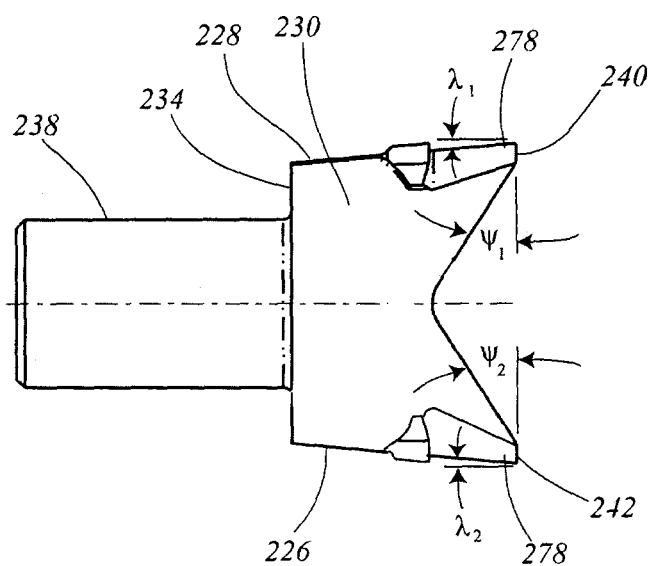

The intersection of the front end with the lateral sides 226, 228 and the outer side 230 form the two cutting tips 240, 242 at the outermost radius $R_1$ of saw blade 222. Outer side 230 may itself be centrally relieved as at 256, having a valley shape between two flank portions 258, 260 that are angled as at angle γ, as seen in FIG. 6c, and in which the leading edges of those flank portions are rearwardly relieved or raked at angles $\phi_1$ and $\phi_2$, which may be equal in magnitude, as seen best in FIG. 6d. In this geometry there are four primary cutting edges 262, 264, 266 and 268, 262 and 268 being the leading cutting edges of sides 226 and 228 respectively, and edges 264 and 266 being the upper and lower leading edges of portions 258 and 260 of radially outer side 230. The intersection of the inner portions 270 of lateral sides 226, 228 with the inner portion 246 of the front end 236 may be angled to provide cutting relief and not form cutting edges. In addition to the inward, rearwardly running cutting tip rake angle as at $\phi_1$ and $\phi_2$, tips 240, 242 are also rearwardly relieved on external side 230, as at angle η. Further still, lateral sides 226, 228 may be rearwardly relieved in the direction of circumferential motion, as indicated by rake angle $\lambda_1$ and $\lambda_2$. Again, while it may be convenient for $\lambda_1$ and $\lambda_2$ to be equal, in the general case this need not necessarily be so. It may be noted that to the extent that lateral sides 226, 228 have a predominant, planar portion, 272, that this plane is angled both radially and circumferentially. The minor, or inner triangular portion 270 is angled radially, following the taper of $\alpha_1$ or $\alpha_2$ as may be, but is not vertically proud of the long side edge or vertex 276 of predominant portion 272, but rather, may be circumferentially (or, in the co-ordinates of the tooth itself, longitudinally, or in the x-direction) flush (or level with) or shy of, that vertex 276 where portions 272 and 270 meet. The outer edges of tips 240, 242 are diagonally bevelled, or chamfered, as at 278 as may tend to improve durability of cutting tips 240, 242. Whereas a normal vector to surface portion 272 may lie in neither the xy (r, theta), xz (theta, z) or yz (rz) planes, the normal vector of portion 270 may lie in the yz (or rz) plane.

In this embodiment there is a tooth assembly, (i.e., tooth 220), for a cutting saw blade. Tooth 220 includes a body with a mounting end, a front end, two lateral sides that diverge radially outwardly (on taper angles $\alpha_1$ and $\alpha_2$) and that may diverge in the circumferentially forward direction (on relief angle $\lambda_1$ or $\lambda_2$), one outer side 232, that diverges circumferentially forwardly (or longitudinally forwardly, as may be) on relief angle η, and one inner side 230. The intersection of the front end with the lateral sides and the outer side form two cutting tips 240, 242 and four cutting edges 262, 264, 266, and 268, the front end 234 being concave, with a cylindrical shank 238 attached to the mounting end 236 of the tooth body 224 extending generally along a tangential axis to the disc (the x-axis in terms of the tooth), the shank being threaded to provide a fitting in the nature of an attachment, or attachment means, by which to secure tooth 220 to the circular saw disc. The lateral sides may include two or more surfaces, such as 272, 274, as may the outer side as at 258, 260. Further, tooth 220 includes secondary cutting members or tips 290, 292, which may be taken as having the same shape and structure as tips 90, 92 described above.

Figure 7A:
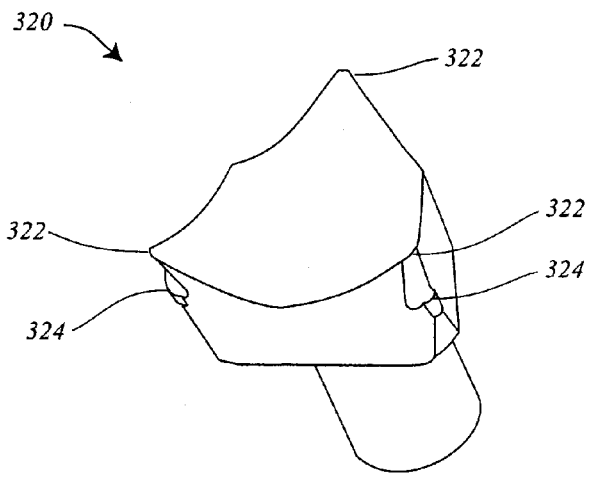
FIG. 7a is a perspective view of another alternate embodiment of tooth to that of FIG. 2a, being a tooth of generally triangular shape as viewed from the front.
Figure 7B:
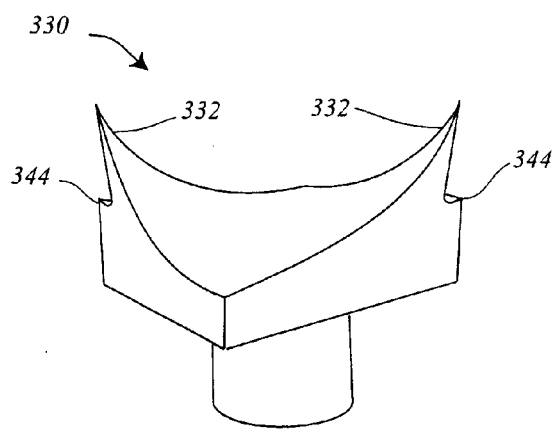
FIG. 7b shows a perspective view of a further alternate embodiment of saw tooth to that of FIG. 2a, being a two pointed saw tooth.
Figure 7C:
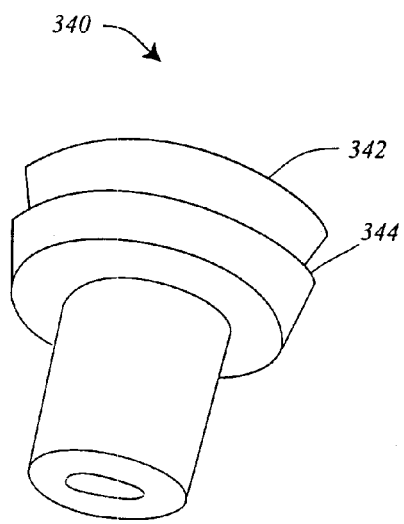
FIG. 7c is a perspective view of a further alternate embodiment of tooth to that of FIG. 2a, being a saw tooth of round shape when viewed from the front.

FIGS. 7a, 7b, and 7c show further embodiments of teeth 320, 330 and 340, respectively. Tooth 320 is a generally triangular (as opposed to square) tooth 320 having three primary tips 322, and three secondary tips 324. Tooth 330 has two primary tips 332, and two secondary tips 334. Tooth 340 is a circular tooth, having a first, circular cutting edge 342 and a trailing secondary cutting edge 344. In each case, the primary and secondary tooth structures are analogous in concept and structure to those of teeth 20, 120 and 220 described above. As noted in the context of FIG. 4f, the secondary tips may extend about all, or substantially all, of the periphery of the tooth, whether two pointed, three pointed, four pointed or some other, and the cutting tips may be made of steel or may be provided with ceramic inserts, as may be.

In the various embodiments described herein, in the as new condition the leading point of the secondary tip, indicated at 103 of tips 90, 92, 94, 96 is located between about ¼ to ⅗ of the length of the tooth (i.e. that length being measured from tip 46 to mounting end 34, excluding shark 38) behind the leading tip. More narrowly, it may be that this distance is about ⅓ to ⅜ of that length. Where there are more the two teeth, the spacing of the successive teeth may be roughly equal and may extend over ⅖ to ¾ if the length of the tooth body.

Various embodiments have been described in detail. Since changes in and or additions to the above-described examples may be made without departing from the nature, spirit or scope of the invention, the invention is not to be limited to those details.

I claim:

1. A tooth assembly releasably mountable to a circular saw disc of a feller head, said tooth assembly comprising:
   a body with a mounting end and a front end distant from the mounting end, in operation, the front end leading the mounting end in a direction of advance as the saw disc turns;
   said body having an axial centerline running from said mounting end to said front end;
   said front end being bigger than said mounting end, and said body narrowing from said front end to said mounting end;
   a plurality of primary cutting tips mounted at said front end, said plurality of primary cutting tips including a first primary cutting tip; and a plurality of secondary cutting tips, each of said secondary cutting tips being mounted in a trailing position relative to a respective one of said primary cutting tips;

said tooth assembly being repositionable relative to the circular saw disc by angular displacement about said axial centerline to present different ones of said primary cutting tips to a workpiece to be cut; and both said primary cutting tips and said secondary cutting tips facing in the direction of advance.

2. The tooth assembly of claim 1 wherein at least one of said primary cutting tip and said secondary cutting tip includes a wear member.

3. The tooth assembly of claim 2 wherein said wear member is a ceramic insert.

4. The tooth assembly of claim 1 wherein as manufactured and when viewed from the direction of advance of the tooth, said secondary cutting tip is one of (a) flush with; and (b) proud of, said primary cutting tip.

5. The tooth assembly of claim 1 wherein as manufactured, said secondary cutting tip is one of (a) flush with; and (b) shy of, said primary cutting tip.

6. The tooth assembly of claim 1 wherein said primary cutting tip is at least partially self-resharpening.

7. The tooth assembly of claim 1 wherein said primary cutting tip has a rearwardly trailing flank, said rearwardly trailing flank being located in a leading position relative to said secondary cutting tip, and said secondary cutting tip has a discharge directed to pass cuttings across said trailing flank of said primary cutting tip.

8. The tooth of claim 1 wherein said tooth has four primary cutting tips and four secondary cutting tips and said body is substantially square in section perpendicular to said axial centerline.

9. The tooth of claim 8 wherein said body of said tooth is rearwardly tapering.

10. The tooth of claim 8 further comprising four ceramic wear inserts, each mounted to a respective one of said primary cutting tips.

11. The tooth of claim 8 wherein each of said secondary cutting tips includes a ceramic wear insert.

12. The tooth of claim 11 wherein said ceramic wear inserts of said secondary cutting tips co-operate to extend about at least ¾ of said body of said tooth.

13. The tooth of claim 1 wherein said tooth includes at least one tertiary cutting tip located in a trailing position relative to a corresponding secondary cutting tip.

14. The tooth of claim 13 wherein at least one of said primary, secondary and tertiary cutting tips has a wear insert.

15. The tooth of claim 1 wherein said tooth is selected from the group of teeth consisting of (a) teeth having a round circumferential cutting edge; (b) teeth having only two primary cutting tips; and (c) teeth having a generally triangular body shape when viewed from in front.

16. The tooth of claim 1, wherein said tooth has a main body length and said secondary cutting tip is located between ¼ and ⅜ of said main body length rearwardly of said primary cutting tip.

17. A releasably mountable cutting tooth for mounting on a circular saw disc of a feller head of a tree felling apparatus, said cutting tooth comprising:

a body with a mounting end and a front end distant from the mounting end, in operation, the front end leading the mounting end in a forward direction of cut as the saw disc turns;

said body having a fitting by which releasably to mount said body to a tooth seat of the circular saw disc, said body being mountable thereto in a plurality of positions;

a plurality of primary cutting tips mounted at said front end of said body, said plurality of primary cutting tips including a first primary cutting tip; and a plurality of secondary cutting tips, said secondary cutting tips being located along said body in a position between said front end and said mounting end, each said secondary cutting tip being mounted in a trailing position relative to a respective one of said primary cutting tips;

said plurality of primary cutting tips including four primary cutting tips;

said plurality of secondary cutting tips including four secondary cutting tips;

said body being substantially square in section;

said body having an axial centerline extending from said front end to said mounting end;

said body having a substantially frusto-pyramidal shape centered on said axial centerline, said frusto-pyramidal shape being wider at said front end and narrower at said mounting end;

said frusto-pyramidal shape has vertices on a rearwardly converging taper;

said four primary cutting tips are defined on said vertices at said front end of said body;

each of said four secondary cutting tips is mounted rearwardly along a respective one of said vertices from one of said tips; and said fitting permits said body to be rotated about said axial centerline in 90 degree increments, whereby said cutting tips may be rotated as said tips become worn.

18. The cutting tooth of claim 1 wherein said tooth has four primary cutting tips and four secondary cutting tips and said body is substantially square in section perpendicular to said axial centerline.

19. The cutting tooth of claim 18 wherein:

said body has a substantially frusto-pyramidal shape centered on said axial centerline, said frusto-pyramidal shape being wider at said front end and narrower at said rear end;

said frusto-pyramidal shape has vertices on a rearwardly converging taper;

said four primary cutting tips are defined on said vertices at said front end of said body;

each of said four secondary cutting tips is mounted rearwardly along a respective one of said vertices from one of said tips; and said fitting permits said body to be rotated about said axial centerline in 90 degree increments, whereby said cutting tips may be rotated as said tips become worn.

20. A combination of a plurality of teeth, each tooth being a tooth according to claim 17, and a tree felling apparatus feller head circular saw disc, wherein:

the saw disc has a periphery and a plurality of cutting tooth seats located about said periphery;

each said tooth is releasably mounted to a respective one of said tooth seats;

each tooth has a plurality of said primary and secondary cutting tips, and each said tooth being repositionable relative to its respective seat.

* * * * *

UNITED STATES PATENT AND TRADEMARK OFFICE
CERTIFICATE OF CORRECTION

PATENT NO.       : 8,430,009 B2
APPLICATION NO. : 12/524902
DATED            : April 30, 2013
INVENTOR(S)      : Maurice Micacchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this
Eighth Day of September, 2015

Michelle K. Lee
*Director of the United States Patent and Trademark Office*